Patented July 25, 1944

2,354,187

UNITED STATES PATENT OFFICE 2,354,187

AZO DYESTUFFS

Friedrich Felix, Basel, and Rudolf von Capeller, Riehen, Switzerland, assignors to the firm of Society of Chemical Industry in Basle, Basel, Switzerland No Drawing. Original application July 8, 1938, Serial No. 218,221. Divided and this application November 7, 1938, Serial No. 239,404. In Switzerland July 10, 1937

9 Claims. (Cl. 260—205)

This application is a division of our application for patent Serial No. 218,221, filed in U. S. A. on July 8, 1938.

It has been found that dyestuffs of the general formula

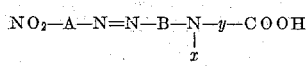

wherein A is an aromatic nucleus of the benzene series which contains a nitro-group in para-position to the azo-group, B is an aromatic nucleus of the benzene or naphthalene series and $x$ is hydrogen or alkyl, and $y$ corresponds to the formula

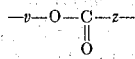

wherein $v$ is a divalent aliphatic, straight radical which may also contain substituents and $z$ is a carbon bridge consisting of at least 2 and not more than 6 carbon atoms, are particularly valuable dyestuffs which in the form of their alkali salts are soluble in water and may be used for dyeing various materials. These dyestuffs are red to dark powders and dye various materials orange, red, violet, blue and green tints. The expression "a carbon bridge consisting of at least 2 and not more than 6 carbon atoms" includes the radical of maleic acid, the —CH=CH— group, the radical of succinic acid, the —CH₂—CH₂— group, the radical of phthalic acid, the —C₆H₄— group, etc.

Such dyestuffs are easily formed by treating the compounds of the general formula

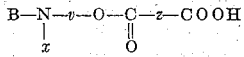

wherein B is a substituent which in 4-position to the N-group does not prevent the entry of a diazo-radical, $x$ is hydrogen or alkyl, $v$ is a divalent straight, aliphatic residue and $z$ is the radical of an organic dicarboxylic acid, with the diazo-compounds of compounds nitrated in para-position to the amino-group. One may also start from the dyestuffs of the general formula

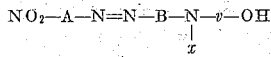

(wherein A, B, $x$ and $v$ have the significance given above) and treat the same with dibasic dicarboxylic acids.

The azo-dyestuffs obtainable by this invention contain, therefore an externally bound acid group. In consequence they form with neutralizing agents salts which dissolve in water, especially salts of the alkalis or of ammonia. These dyestuffs have, especially when besides the said acid residue of a polybasic acid, they contain no sulfonic acid groups, a pronounced affinity for esters and ethers of cellulose and may, therefore, be used with advantage for dyeing and printing acetate artificial silk. As compared with the insoluble dyestuffs they have the advantage that they dissolve easily in water and, therefore, require no dispersing agent for producing a fine distribution. As the residue of the organic acid is only feebly acid in nature, it may be desirable to use in dyeing, small proportions of substances of alkaline reaction, for instance ammonia or an alkali salt of phosphoric acid or even an organic base, for instance pyridine, ethanolamine or the like. If the dyestuff is sparingly soluble or easily parts with the residue of the group which lends solubility, in dyeing, the dyestuff preparation or the dyebath may advantageously receive an addition of a dispersing or emulsifying agent, for instance soap or soap substitute.

Among the polybasic acids which are useful for making the new dyestuffs, provided that they react with the dyestuffs or suitable intermediate products, the following may be named: polybasic acids which may be used either as such or in the form of their anhydrides, halides, or esters of low molecular weight. Such acids are, for example, oxalic acid, malonic acid, succinic acid, glutaric acid, adipic acid, pimelic acid, pyridine dicarboxylic acids or the like, and also unsaturated acids like fumaric acid and maleic acids. Further phthalic acids, naphthalic acid and their sulfonic acids come into question. Also sulfoacetic acid, sulfobenzoic acid, sulfosalicyclic acid may be used. These acids may be substituted in an aliphatic chain or at the aromatic nucleus by any residue, for instance an alkyl group, a hydroxyl group or an alkoxy group. The reaction with the aromatic hydroxyamine best occurs when this compound directly or in an organic solvent is heated with the acid, for which purpose, where it is possible, such a derivative of the acid is selected as is easily capable of esterification, for instance an anhydride, a halide or an ester of an aliphatic alcohol of low molecular weight, for instance malonic acid ethyl ester. This reaction may be performed with the following bases: N-(methyloxyethyl)-phenylamine, N-(ethyloxyethyl)-phenylamine, N-(methyloxyethyloxyethyl)-phenylamine, N-(propyloxyethyl)-phenylamine, N-(isopropyloxyethyl)-phenylamine, N-(butyloxyethyl)-phenylamine, N-(isobutyloxyethyl)-phenylamine, N-amyloxyethyl)-phenylamine, N-(cetyloxyethyl)-phenylamine or the like. The benzene nucleus may be substituted as desired by a methyl group, an alkoxy group or the like, provided that the para-position to the substituted amino-group still contains a hydrogen atom which can be exchanged for the diazo-residue. There come also into question, suitable N-substitution products of 3-methyl-phenylamine, 5-methyl-2-methoxyphenylamine or the like, for instance N-(propyloxyethyl)-3-methyl-phenylamine, N-(butyloxyethyl)-3-methylphenylamine. Also suitable N-substitution products of 3-acidylaminophenylamine, for instance 3-acetylamino-6-methoxy-1-(N-ethyloxyethyl)-phenylamine, N-(butyloxyethyl)-2-methoxy-5-acetylaminophenylamine. Dyestuffs which dye equally well are produced by using such reaction products from N-(butyloxethyl(-2-methoxy - 5 - methyl))-phenylamine and N-(propyloxethyl(2 - methoxy-5-methyl))-phenylamine.

These intermediate products are sparingly soluble in water but dissolve freely in dilute mineral acids and in water in the form of their alkali and alkaline earth salts.

When these compounds, which are suitable for use as coupling components, are caused to react in neutral or feebly acid medium with diazo-compounds, dyestuffs are obtained which are soluble in water in the form of their alkali salts. As bases of which the diazo-compounds are used, there are suitable the aromatic amines commonly used containing a nitro-group in para-position, for instance 4-nitroaminobenzene, 4-nitro-2-chloraminobenzene, 4-nitro - 2 - methoxyaminobenzene, 4-nitromethylsulfonaminobenzene, 4-nitro - 2 - cyano-aminobenzene, 2:6-dichloro-4-nitroaminobenzene. Also 2:4-dinitroaminobenzene, 2:4-dinitro-6-cyanaminobenzene, 2:4-dinitrohalogenaminobenzene, 2:4 - dinitro - 6 - methylsulfonaminobenzene, 4-nitro-2-cyano-6-halogenaminobenzenes. One can also use, however, bases which contain sulfonic acid groups, for instance 4-nitroaminobenzene-2-sulfonic acid or the like.

As has already been stated, the finished azo-dyestuffs which contain at least one hydroxyl group united to an aliphatic residue may be treated with polybasic acids of the kind in question. This reaction may occur in a solvent or may also be conducted especially smoothly if the anhydride or halide of the organic acid selected is used.

The dyestuffs obtainable by the invention form salts with metals and in this form are soluble in general in water, particularly in the form of ammonium or alkali metal salts. Such aqueous solutions dye wool, cotton, especially acetate artificial silk, orangle, brown, red, blue and green tints. If the dyestuff contains a free amino-group it may be diazotized in substance and coupled with any coupling component. This operation is advantageously conducted on the dyed fabric.

The intermediate products required are not described in the literature. They are obtainable by processes which are usual for producing esters from compounds containing hydroxyl groups and polybasic acids and the production may, therefore, be said to be an analogous process.

The following examples illustrate the invention the parts being by weight:

Example 1

163 parts of finely powdered phthalic anhydride, 165 parts of N-(ethyloxyethyl)-phenylamine and 500 parts of dry benzene are heated to boiling for about 13 hours under reflux. On distillation of benzene there is obtained the phthalic acid monoester of ethyloxyethylphenylamine, which can be converted into a form suitable for the production of dyestuff by stirring it in water and neutralizing with sodium carbonate or ammonia. This intermediate product has the formula

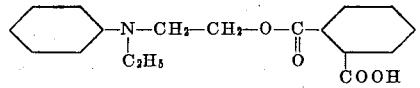

Alternatively, the two products may be mixed and caused to react by heating the mixture without the addition of a solvent. The procedure is similar in making the ester from the other bases named in this specification. Instead of phthalic acid there may be used other acids, for instance malonic acid, succinic acid of the formula

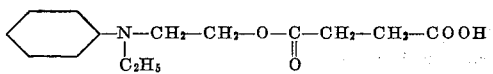

or the like, whereby products of similar properties are obtained.

Example 2

110 parts (10 per cent excess) of finely powdered maleic anhydride are stirred with 179 parts of N-(ethyloxethyl - 3 - methyl)-phenylamine. The temperature rises to 50° C. and the mass is somewhat thick. While stirring, the temperature is raised to 90° C. and kept thereat for 2 hours. The mass is then cooled to 60–70° C. and dilute ammonia is gradually added to it in drops until it is feebly alkaline. This compound has the formula

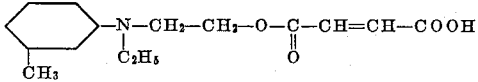

The procedure is the same in making the analogous product from succinic anhydride and also in making corresponding products from other aromatic bases which have as a substituent a hydroxylated alkyl residue attached to the nitrogen. Thus there may be used for example malonic acid, preferably in the form of its dimethylester, further also adipinic acid, pimelic acid, suberic acid, quinolinic acid, and the like.

Example 3

Into the diazo-solution obtained from 138 parts of 4-nitroaminobenzene there are introduced 313 parts of the product of Example 1 in the form of an aqueous solution of its ammonium salt. Coupling is completed by prolonged stirring and if necessary there may be added a neutralizing agent, for example sodium acetate. The dyestuff is then filtered and washed with some water. It is then stirred with a sodium chloride solution and brought to the neutral point with sodium carbonate or ammonia. The dry dyestuff of the formula

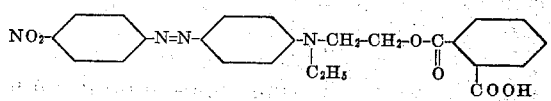

is a dark powder soluble in pure water to a red solution and in aqueous solution dyeing acetate artificial silk, especially in a short liquor, fast red tints.

The same dyestuff is obtained if the dyestuff made by coupling diazotized 4-nitroaminobenzene with N-(ethyloxyethyl)-phenylamine is introduced into molten phthalic anhydride and the mass is then neutralized with aqueous alkali, for instance ammonia, and the dyestuff isolated by salting out if desired.

By coupling diazotized 4-nitroaminobenzene-2-sulfonic acid with the acid maleic acid ester of the N-hydroxyethyl-α-naphthylamine there is obtained a dyestuff which dyes wool violet tints.

*Example 4*

Into a diazo-solution made from 216 parts of 4-nitro-2-methylsulfonaminobenzene are introduced 263 parts of the product of Example 2 in the form of an aqueous solution of its ammonium salt. The coupling is completed by prolonged stirring and a neutralizing agent, for instance sodium acetate, is preferably added. The dyestuff is filtered and washed with some water. It is then stirred in water and brought to the neutral point by means of sodium carbonate or ammonia. When dry it is a dark powder soluble in water to a violet solution and in aqueous solution dyeing acetate artificial silk, especially in a short liquor, fast violet tints. The dyestuff corresponds to the formula

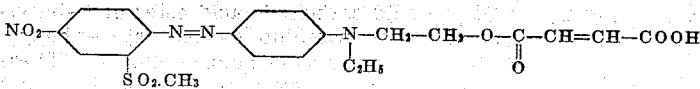

By using the esters of dicarboxylic acids having a longer residue, for example dyestuffs of the following constitution may be obtained

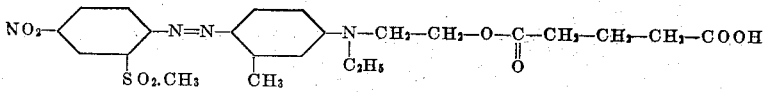

or

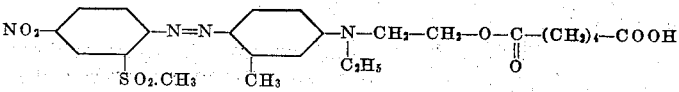

*Example 5*

Into the diazo-solution obtained from 171.5 parts of 4-nitro-2-chloraminobenzene are introduced 307 parts of the monomaleic acid ester of N-(ethyloxy-ethyl(3-methyl-6-methoxy))-phenylamine in the form of an aqueous solution of its ammonium salt. The coupling is completed by prolonged stirring and a neutralizing agent such as sodium acetate is preferably added. The dyestuff is then filtered and again suspended in water and brought to the neutral point by means of sodium carbonate and ammonia. The dry dyestuff is a dark powder soluble in water to a violet solution and dyeing in aqueous solution acetate artificial silk fast violet tints. The dyestuff corresponds to the formula

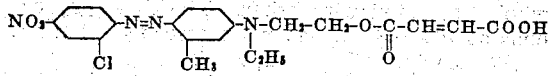

A similar dyestuff is obtained when instead of the maleic acid ester of the above product the corresponding quantity of the maleic acid ester of N-(hydroxyethyl-3-methyl-6-methoxy)-phenylamine is used. This dyestuff corresponds to the formula

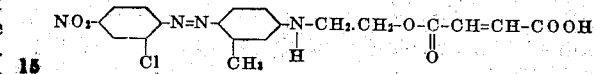

There may also be used similar coupling components, for example of the formula

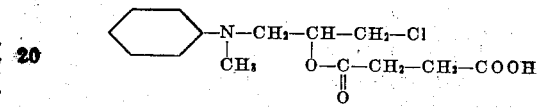

which are obtainable by treating the product of the reaction from monomethaniline and epichlorhydrine with succinic acid anhydride. The mobile γ-chlorine atom may be exchanged, for example for a —CN— group or also for the radical of thioglycollic acid, or for radicals containing nitrogen atoms. Thus there may be used for example coupling components of the formula

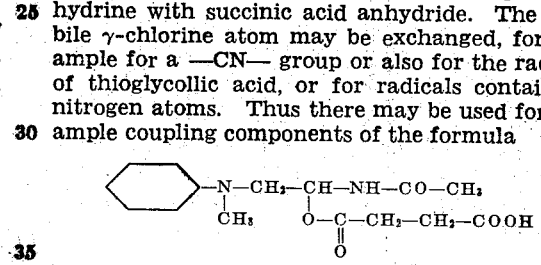

or

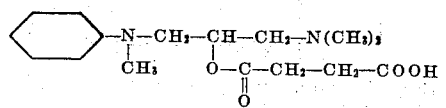

*Example 6*

137 parts of 3-methyl-6-methoxyphenylamine and 60 parts of calcined sodium carbonate are heated together at 70–80° C. Into the well stirred suspension of the sodium carbonate in the molten base there are dropped within 3–4 hours 228 parts of para-toluene sulfonic acid butyl ester. The whole is stirred further for 12 hours in the course of which much carbon dioxide is evolved. On addition of water the monobutyl derivative separates in the form of an oil, and is extracted by ether. By vacuum distillation it is purified. It boils at 140–143° C. under a pressure of 11 mms.

193 parts of N-butyl-(3-methyl-6-methoxy)-phenylamine, 100 parts of ethylene chlorhydrin and 30 parts of calcium oxide are heated together at 100–110° C. for 24 hours while stirring well. The product is then mixed with water and the whole extracted with ether. The final product boils at 160–168° C. under a pressure of 11 mms.

237 parts of N-butyloxethyl-(3-methyl-6-methoxy)-phenylamine and 108 parts of maleic acid anhydride are stirred together at room temperature; the heat of the reaction raised the temperature to about 60° C., at which temperature the viscous mass is maintained for about 1 hour by gentle heating. On cooling the esterified product solidifies. By stirring the mass with dilute ammonia in a small excess there is obtained a clear solution of the salt of the maleic acid ester.

335 parts of this acid maleic acid ester of the formula

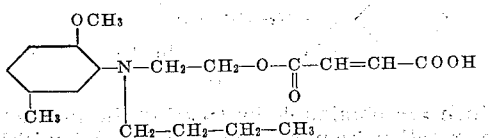

in the form of a feebly ammoniacal solution are poured while stirring well into a dilute and ice-cooled solution of 138 parts of diazotized para-nitraniline. The reaction is soon at an end and, if desired, the completion may be accelerated by adding a neutralizing agent, for instance sodium acetate. A red dyestuff soluble in the form of an alkali salt is produced; it corresponds to the formula

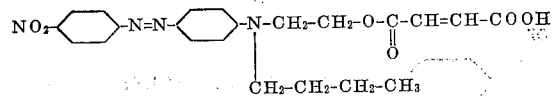

and dyes in aqueous solution acetate artificial silk fast red tints.

*Example 7*

335 parts of the maleic acid ester made as described in paragraph 3 of Example 6 from the base therein named in the form of a feebly ammoniacal solution are poured into a well stirred and ice-cooled solution of 138 parts of diazotized 4-nitro-2-methylsulfonaminobenzene. By neutralizing the mineral acid with crystallized sodium acetate the coupling is brought to an end. There is obtained a blue-violet dyestuff soluble in water; in dry condition it is a dark powder which dissolves in water in the form of a salt and in this solution dyes acetate artificial silk deep blue-violet tints. The dyestuff corresponds to the formula

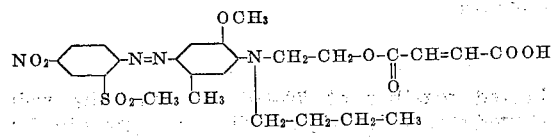

*Example 8*

261 parts of 4:6-dinitro-2-methylsulfonaminobenzene are diazotized in nitrosylsulfuric acid and the mixture is gradually added by drops while stirring well to a strongly diluted and ice-cooled solution of 335 parts of the maleic acid ester made as described in paragraph 3 of Example 6. The solution should contain so much sodium acetate as is necessary for neutralizing the mineral acid. The dyestuff is filtered and neutralized in water with ammonia. When dry it is a dark powder soluble in water, and in aqueous solution dyeing acetate artificial silk fast blue tints. The product has the formula

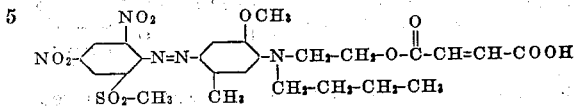

The operation is the same when 4-nitro-6-chloro-2-methylsulfonaminobenzene or 2:4-dinitro-6-chloro- or -bromoaminobenzene is used.

Products dyeing green tints are obtained by using the coupling components of the formula

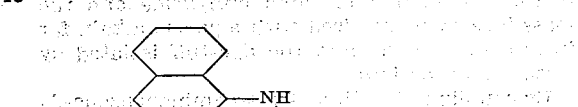

wherein instead of the diazo compound used in this example there may be used other compounds, for instance 2:4-dinitro-6-cyanoaminobenzene, or 4-nitro-2-cyano-6-chlorobenzene. The above coupling component may also contain a hydroxyl-group in the nucleus, for example in 5-position.

The dyestuff of the formula

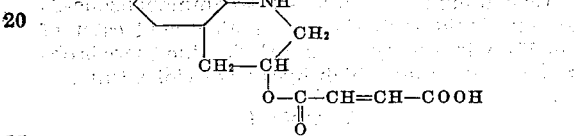

is also a valuable product.

Instead of the coupling components described in these examples, there may be used, for instance, an acid carboxylic acid ester of N-butyloxyethyl-(3-acetylamino-6-methoxy)-phenylamine, similar dyestuffs being obtained. These coupling components may also be caused to react with the diazo-compound of 1-amino-2:4-dinitro-6-chlorobenzene whereby there is obtained a blue-dyeing dyestuff of the formula

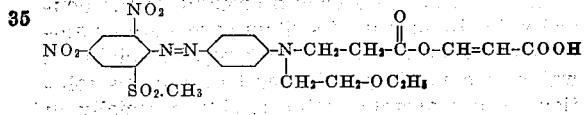

Redder dyestuffs are obtained by using acid carboxylic acid esters from N-(propyl- or N-(butyloxethyl)-phenylamine or N-(butyloxethyl)-3-methylphenylamine.

*Example 9*

0.5 part of the dyestuff described in Example 8 is dissolved in 3000 parts of water. This dyebath is then mixed with 40 parts of crystallized sodium sulfate and 100 parts of acetate artificial silk yarn are handled therein for one hour at 80° C. After rinsing and drying, the artificial silk has a pure blue tint.

Depending upon the choice of dyestuff, acetate artificial silk can be dyed various tints.

The following table indicates other combina-

| | Diazo component | Coupling component | Dyeing acetate artificial silk |
|---|---|---|---|
| 1 | 4-nitroaminobenzene | Monophthalic acid ester of methyloxethylphenylamine | Scarlet. |
| 2 | 4-nitro-2-chloraminobenzene | Monophthalic acid ester of ethyloxethylphenylamine | Red. |
| 3 | 3-nitro-5-methoxyaminobenzene | ___do___ | Yellow orange. |
| 4 | 4-nitro-2-methoxyaminobenzene | ___do___ | Red. |
| 5 | 4-nitro-2-methylsulfonaminobenzene | ___do___ | Red violet. |
| 6 | 4-nitroaminobenzene | Monosuccinic acid ester of ethyloxethylphenylamine | Scarlet. |
| 7 | 4-nitro-2-chloraminobenzene | ___do___ | Bordeaux. |
| 8 | 4-nitro-2-methoxyaminobenzene | ___do___ | Red. |
| 9 | 4-nitro-2-methylsulfon-aminobenzene | ___do___ | Violet. |
| 10 | 4-nitro-aminobenzene | Monomaleic acid ester of ethyloxethylphenylamine | Scarlet. |
| 11 | 4-nitro-2-chloraminobenzene | ___do___ | Red. |
| 12 | 4-nitro-2-methoxyaminobenzene | ___do___ | Do. |
| 13 | 4-nitro-2-methylsulfonaminobenzene | Monomaleic acid ester of methyloxethylphenylamine | Violet. |
| 14 | 4-nitro-2-methylsulfonaminobenzene | Monomaleic acid ester of ethyloxethyl-3-methyl-6-methoxyphenylamine | Reddish blue. |
| 15 | 4-nitroaminobenzene | Monomaleic acid ester of methyl-oxethyl-3-methyl-6-methoxyphenylamine | Red. |
| 16 | 4-nitro-2-chloraminobenzene | Monomaleic acid ester of methyl-oxethyl-3-methyl-6-methoxyphenylamine | Violet. |
| 17 | 4-nitro-2-methoxyaminobenzene | Monomaleic acid ester of ethyloxyethyl-3-methyl-6-methoxyphenylamine | Red. |
| 18 | 4-nitro-2-cyanaminobenzene | ___do___ | Violet. |
| 19 | 2:4-dinitro-6-bromaminobenzene | ___do___ | Dull blue. |
| 20 | 2:4-dinitro-6-bromaminobenzene | Monomaleic acid ester of ethyloxethyl-3-methylphenylamine | Violet. |
| 21 | 4-nitro-2-methylsulfonaminobenzene | ___do___ | Do. |
| 22 | 2:6-dichloro-4-nitroaminobenzene | ___do___ | Brown. |

What we claim is:

1. The unsulfonated mono-azo-dyestuffs of the general formula $$NO_2-A-N=N-B-\underset{x}{N}-y-COOH$$

wherein A is an aromatic nucleus of the benzene series in which the nitro-group stands in para-position to the —N=N— group, B is an aromatic nucleus selected from the group consisting of aromatic nuclei of the benzene and naphthalene series, $x$ is a member selected from the group consisting of hydrogen and alkyl and $y$ is a $$-v-O-\underset{O}{\overset{\|}{C}}-z-$$

group in which $v$ is linked to the $$-\underset{x}{N}-$$

group and $z$ is linked to the COOH— group, wherein $v$ is a divalent, aliphatic, straight radical consisting of at least 2 and not more than 3 carbon atoms, and $z$ is a carbon bridge consisting of at least 2 and not more than 6 carbon atoms, which dyestuffs are red to dark powders which in the form of their alkali metal salts dissolve to orange to red, to brown, to violet, to blue and to green solutions.

2. The unsulfonated mono-azo-dyestuffs of the general formula $$NO_2-A-N=N-B-\underset{x}{N}-y-COOH$$

wherein A is an aromatic nucleus of the benzene series in which the nitro-group stands in para-position to the —N=N— group, B is an aromatic nucleus selected from the group consisting of aromatic nuclei of the benzene and naphthalene series, $x$ is a member selected from the group consisting of hydrogen and alkyl and $y$ is a $$-CH_2-CH_2-O-\underset{O}{\overset{\|}{C}}-z-$$

group in which the —CH₂—CH₂— group is linked to the $$-\underset{x}{N}-$$

group and $z$ is linked to the COOH— group, wherein $z$ is a carbon bridge consisting of at least 2 and not more than 6 carbon atoms, which dyestuffs are red to dark powders which in the form of their alkali metal salts dissolve to orange to red, to brown, to violet, to blue and to green solutions.

3. The unsulfonated mono-azo-dyestuffs of the general formula $$NO_2-A-N=N-B-\underset{x}{N}-y-COOH$$

wherein A is an aromatic nucleus of the benzene series in which the nitro-group stands in para-position to the —N=N— group, B is an aromatic nucleus of the benzene series in which the —N=N— group and the $$-\underset{x}{N}-$$

group stand in para-position to each other, $x$ is a member selected from the group consisting of hydrogen and alkyl and $y$ is a $$-CH_2-CH_2-O-\overset{\|}{\underset{O}{C}}-z-$$

group in which the —CH₂—CH₂— group is linked to the $$-\underset{x}{N}-$$

group and $z$ is linked to the COOH— group, wherein $z$ is a carbon bridge consisting of at least 2 and not more than 6 carbon atoms, which dyestuffs are red to dark powders which in the form of their alkali metal salts dissolve to orange to red, to brown, to violet and to blue solutions.

4. The azo-dyestuff of the formula $$NO_2-\underset{Cl}{\overset{NO_2}{\bigcirc}}-N=N-\underset{\underset{CH_3}{\overset{C=O}{\underset{|}{NH}}}}{\bigcirc}-N(CH_2-CH_2-CH_3)-CH_2-CH_2-O-\overset{\|}{\underset{O}{C}}-CH=CH-COOH$$

dissolving in water to a blue solution and dyeing acetate artificial silk similar tints.

5. The unsulfonated mono-azo-dyestuffs of the general formula $$NO_2-A-N=N-B-\underset{X}{N}-y-COOH$$

wherein A is an aromatic nucleus of the benzene series in which the nitro-group stands in para-position to the —N=N— group, B is an aromatic nucleus of the benzene series in which the —N=N— group and the $$-\underset{X}{\overset{-N-}{|}}-$$

group stand in para-position to each other, X is alkyl and y is a $$-CH_2-CH_2-O-\underset{O}{\overset{C-z-}{\|}}$$

group in which the —CH₂—CH₂— group is linked to the $$-\underset{X}{\overset{-N-}{|}}-$$

group and z is linked to the COOH group, wherein z is a carbon bridge consisting of at least 2 and not more than 6 carbon atoms.

6. A process for the manufacture of unsulfonated mono-azo dyestuffs of the general formula $$NO_2-A-N=N-B-\underset{X}{\overset{N-}{|}}-y-COOH$$

wherein A is an aromatic nucleus of the benzene series in which the nitro-group stands in para-position to the —N=N— group, B is an aromatic nucleus of the benzene series in which the —N=N— group and the $$-\underset{X}{\overset{-N-}{|}}-$$

group stand in para-position to each other, X is alkyl and y is a $$-CH_2-CH_2-O-\underset{O}{\overset{C-z-}{\|}}$$

group in which the —CH₂—CH₂— group is linked to the $$-\underset{X}{\overset{-N-}{|}}-$$

group and z is linked to the COOH— group, wherein z is a carbon bridge consisting of at least 2 and not more than 6 carbon atoms, which comprises reacting a compound of the formula $$B-\underset{X}{\overset{N-CH_2-CH_2-OH}{|}}$$

successively in any order with diazotized NO₂—A—NH₂, wherein the NO₂ group is in p-position to the NH₂ group, and with $$HOOC-z-COOH$$

A, B, X and z having the aforementioned significances.

7. A process for the manufacture of unsulfonated mono-azo dyestuffs which comprises reacting a compound of the formula $$B-\underset{X}{\overset{N-y-COOH}{|}}$$

wherein B is an aromatic nucleus of the benzene series capable of coupling at the 4-position to the $$-\underset{X}{\overset{N-}{|}}-$$

group with a diazo compound, X is alkyl, and y is a $$-CH_2-CH_2-O-\underset{O}{\overset{C-z-}{\|}}$$

group in which the —CH₂—CH₂— group is linked to the $$-\underset{X}{\overset{N-}{|}}-$$

group and z is linked to the —COOH group, z representing a carbon bridge consisting of at least two and not more than six carbon atoms, with a compound of the formula NO₂—A—NH₂ wherein the NO₂ group is in p-position to the NH₂ group.

8. A process for the manufacture of unsulfonated mono-azo dyestuffs which comprises reacting a compound of the formula $$NO_2-A-N=N-B-\underset{X}{\overset{N-CH_2-CH_2OH}{|}}$$

wherein A is an aromatic nucleus of the benzene series in which the nitro group stands in p-position to the —N=N— group, B is an aromatic nucleus of the benzene series in which the —N=N— group and the $$-\underset{X}{\overset{-N-}{|}}-$$

group stand in p-position to each other, with a compound of the formula HOOC—z—COOH wherein z is a carbon bridge of at least two and not more than six carbon atoms until the corresponding half-ester is formed.

9. The unsulfonated mono-azo compounds, being the acids and the alkali metal and ammonium salts of the compounds which in the form of their acids are represented by the general formula $$NO_2-A-N=N-B-\underset{X}{\overset{N-y-COOH}{|}}$$

wherein A is an aromatic nucleus of the benzene series in which the nitro-group stands in para-position to the —N=N— group, B is an aromatic nucleus of the benzene series in which the —N=N— group and the $$-\underset{X}{\overset{-N-}{|}}-$$

group stand in para-position to each other, X is alkyl and y is a $$-CH_2-CH_2-O-\underset{O}{\overset{C-z-}{\|}}$$

group in which the —CH₂—CH₂— group is linked to the $$-\underset{X}{\overset{-N-}{|}}-$$

group and z is linked to the COOH— group, wherein z is a carbon bridge consisting of at least 2 and not more than 6 carbon atoms.

FRIEDRICH FELIX.
RUDOLF VON CAPELLER.